(12) United States Patent
Mager

(10) Patent No.: US 11,363,811 B2
(45) Date of Patent: Jun. 21, 2022

(54) WATERFOWL DECOY MOVEMENT DEVICE

(71) Applicant: Carl Ray Mager, Grafton, IL (US)

(72) Inventor: Carl Ray Mager, Grafton, IL (US)

(73) Assignee: C. AND J. ENTERPRISES, INC., Grafton, IL (US)

( * ) Notice: Subject to any disclaimer, the term of this patent is extended or adjusted under 35 U.S.C. 154(b) by 574 days.

(21) Appl. No.: 16/196,705

(22) Filed: Nov. 20, 2018

(65) Prior Publication Data

US 2019/0082676 A1    Mar. 21, 2019

Related U.S. Application Data

(63) Continuation of application No. 14/256,400, filed on Apr. 18, 2014, now abandoned.

(60) Provisional application No. 61/958,428, filed on Jul. 29, 2013.

(51) Int. Cl.
*A01M 31/06* (2006.01)

(52) U.S. Cl.
CPC .................. *A01M 31/06* (2013.01)

(58) Field of Classification Search
CPC ...................................... A01M 31/06
USPC .......................................... 43/2, 3
See application file for complete search history.

(56) References Cited

U.S. PATENT DOCUMENTS

| | | | | |
|---|---|---|---|---|
| 710,433 A | * | 10/1902 | Coudon ................ | A01M 31/06 43/3 |
| 1,788,889 A | * | 1/1931 | Ritchie ...................... | F41J 9/02 273/366 |
| 2,482,979 A | * | 9/1949 | Isakson ................... | A47G 33/12 248/188.7 |
| 2,624,144 A | * | 1/1953 | Beverman ............. | A01M 31/06 43/3 |
| 3,016,647 A | | 4/1959 | Peterson et al. | |
| 2,952,090 A | * | 9/1960 | Pittenger ............... | A01M 31/06 43/3 |
| 4,535,560 A | * | 8/1985 | O'Neil ................... | A01M 31/06 43/3 |
| 4,660,313 A | * | 4/1987 | Bauernfeind ......... | A01M 31/06 43/3 |
| 4,910,905 A | * | 3/1990 | Girdley ................. | A01M 31/06 43/3 |

(Continued)

FOREIGN PATENT DOCUMENTS

FR    2671691 A1    7/1992

*Primary Examiner* — Peter M Poon
*Assistant Examiner* — Morgan T Barlow
(74) *Attorney, Agent, or Firm* — Sandberg Phoenix & von Gontard P.C.

(57) ABSTRACT

A waterfowl decoy animation device comprising a frame having a first elongated frame member and a second elongated frame member configured in a cruciform configuration, a first pulley wheel rotatably attached to a first end of the first frame member, a second pulley wheel rotatably attached to a second end of the first frame member, a third pulley wheel rotatably attached to a first end of the second frame member, and a fourth pulley wheel rotatably attached to a second end of the second frame member; a drive motor operatively associated with one of the pulley wheels; a drive belt around the pulley wheels; an electric source operatively associated with the drive motor; and at least one waterfowl decoy attached to the drive belt.

5 Claims, 4 Drawing Sheets

(56) References Cited

U.S. PATENT DOCUMENTS

| | | | |
|---|---|---|---|
| 5,074,071 A * | 12/1991 | Dunne | A01M 31/06 43/3 |
| 5,974,720 A * | 11/1999 | Bowling | A01M 31/06 43/2 |
| 6,079,140 A * | 6/2000 | Brock, IV | A01M 31/06 43/3 |
| 6,138,396 A * | 10/2000 | Capps | A01M 31/06 43/3 |
| 6,311,425 B1 * | 11/2001 | Capps | A01M 31/06 43/3 |
| 6,374,529 B1 * | 4/2002 | Petroski | A01M 31/06 43/3 |
| 6,419,198 B1 | 7/2002 | Einav | |
| 6,470,620 B1 | 10/2002 | Acker | |
| 6,574,902 B1 * | 6/2003 | Conger | A01M 31/06 43/2 |
| 6,655,071 B2 * | 12/2003 | Barnes | A01M 31/06 248/150 |
| 6,782,653 B1 * | 8/2004 | Thomas | A01M 31/06 43/2 |
| 6,830,170 B2 * | 12/2004 | Abel | A01M 31/006 190/107 |
| 6,834,458 B1 * | 12/2004 | Hand, III | A01M 31/06 43/2 |
| 7,043,865 B1 * | 5/2006 | Crowe | A01M 31/04 43/3 |
| 7,273,198 B2 * | 9/2007 | Tourtellotte | E04H 12/2238 248/166 |
| 7,503,695 B2 * | 3/2009 | Anderson | A01M 31/06 206/315.11 |
| 7,963,064 B2 | 6/2011 | Smith | |
| 7,975,422 B2 * | 7/2011 | Elliott | A01M 31/06 43/3 |
| 8,887,433 B2 | 11/2014 | Luttrull | |
| 10,010,069 B2 * | 7/2018 | Denson | A01M 31/06 |
| 2006/0207158 A1 * | 9/2006 | Brewer | A01M 31/06 43/3 |
| 2009/0094877 A1 * | 4/2009 | Smith | A01M 31/06 43/3 |
| 2010/0077648 A1 * | 4/2010 | Tucker, Jr. | A01M 31/06 43/3 |
| 2012/0073180 A1 * | 3/2012 | Elliott | A01M 31/06 43/3 |
| 2012/0090217 A1 | 4/2012 | Young | |
| 2013/0014422 A1 * | 1/2013 | Bullerdick | A01M 31/06 43/3 |
| 2014/0245652 A1 * | 9/2014 | Franklin | A01M 31/06 43/2 |

\* cited by examiner

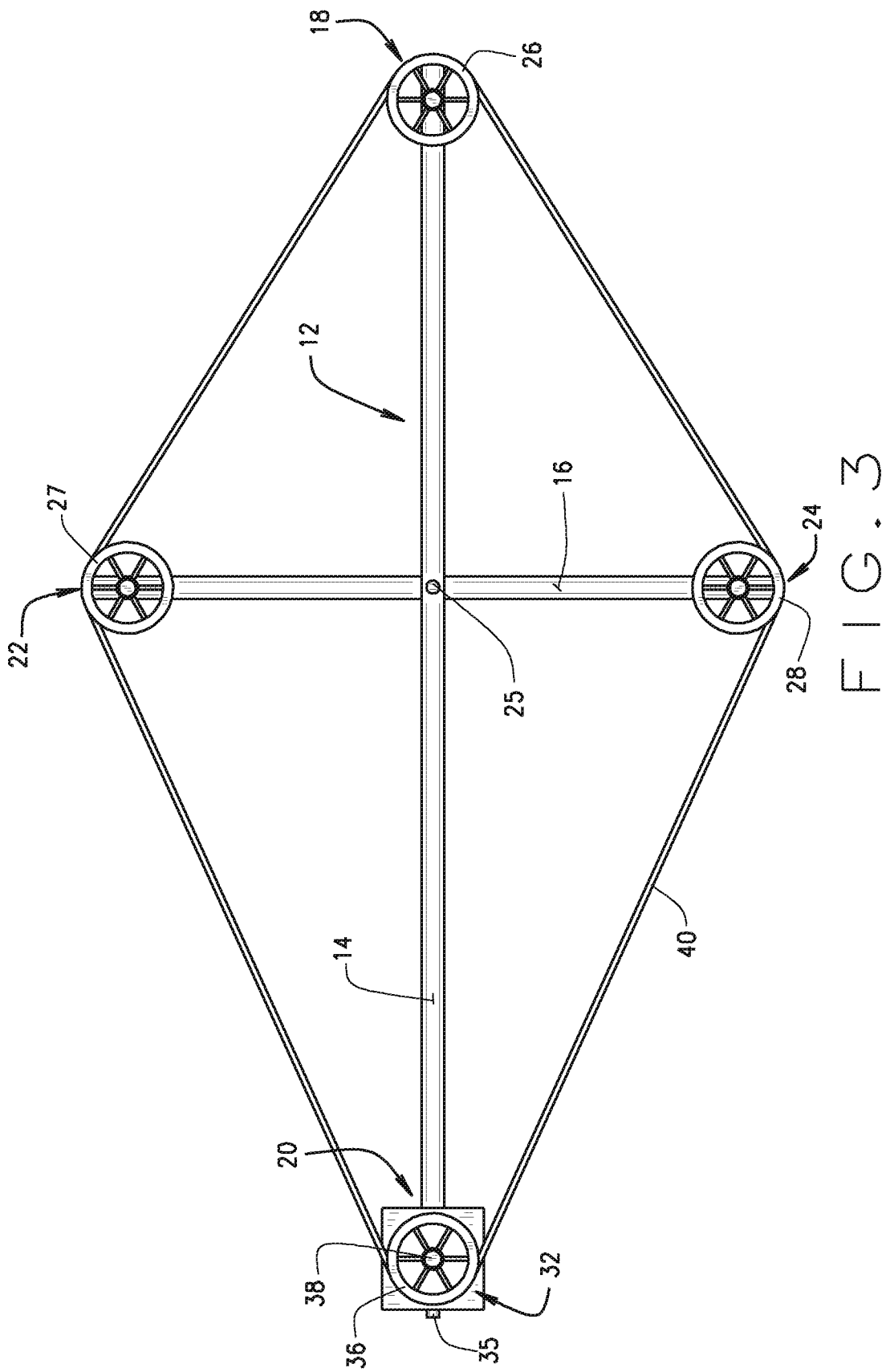

WATERFOWL DECOY MOVEMENT DEVICE

CROSS-REFERENCE TO RELATED APPLICATIONS

This application is a continuation non-provisional application and claims the benefit of non-provisional application Ser. No. 14/256,400 filed Apr. 18, 2014, entitled WATERFOWL DECOY MOVEMENT DEVICE and claims the benefit of provisional application Ser. No. 61/958,428, filed Jul. 29, 2013, which is incorporated herein by reference.

STATEMENT REGARDING FEDERALLY SPONSORED RESEARCH OR DEVELOPMENT

Not Applicable.

BACKGROUND OF THE INVENTION

Waterfowl hunters employ floating decoys to lure or entice waterfowl, for example ducks, closer to the hunter. Often the hunter is housed in a duck blind in or near water known to be habitat for ducks or other waterfowl. The duck hunter places a number of duck decoys on the water adjacent the duck blind. The group of duck decoys employed by a hunter is referred to as the "spread."

There are very few differences between the spread of decoys placed by experienced waterfowl hunters. Each hunter takes into consideration a number of factors when placing his spread, such as wind conditions, the body of water (e.g. river, slough, flooded timber, etc.), water temperature and ambient temperature, visibility, species hunted and decoy movement.

Due to hunting pressure at favorable sites, waterfowl hunters generally seek some variable they can exploit to give them an advantage over fellow hunters when luring or attracting waterfowl. Most of the above factors, such as water temperature and visibility, are beyond the hunter's control. It would be advantageous, therefore, if a hunter had an apparatus that could effect decoy movement to attract more birds.

BRIEF SUMMARY OF THE DISCLOSURE

A self-contained waterfowl decoy movement or animation device comprising a lightweight frame for placement in water comprising elongated frame members with pulley wheels at each free end of the frame members, one of which is a drive pulley wheel; a drive belt around the pulley wheels; an electric motor operatively attached to the drive pulley wheel; and; one or more waterfowl decoys attached to the drive belt by flexible tether lines.

The frame is placed in suitable water, generally submerged, with the waterfowl decoys floating on the surface, each tethered to the drive belt by the flexible line. When the motor is actuated the drive belt moves around the pulley wheels, moving the tethered decoys around the frame to simulate life-like swimming movement.

In a preferred aspect, the frame comprises to elongated members arranged as a cross with the pulley wheels at each end of the crossed members, such that the associated drive belt is arranged in a diamond configuration.

In a preferred aspect, the electric motor is water proof and operatively connected to a battery pack. The battery pack may be waterproof and submergible as well.

In one aspect, there are stilts under the frame for use in deeper water conditions.

Any number of decoys may be attached to the drive belt. The decoys can be any species of waterfowl.

In one preferred aspect the waterfowl decoys are duck decoys.

BRIEF DESCRIPTION OF THE DRAWINGS

FIG. 3 is a top plan view of one aspect of a frame;

Corresponding reference numerals will be used throughout the several figures of the drawings.

DETAILED DESCRIPTION

Figure 1:
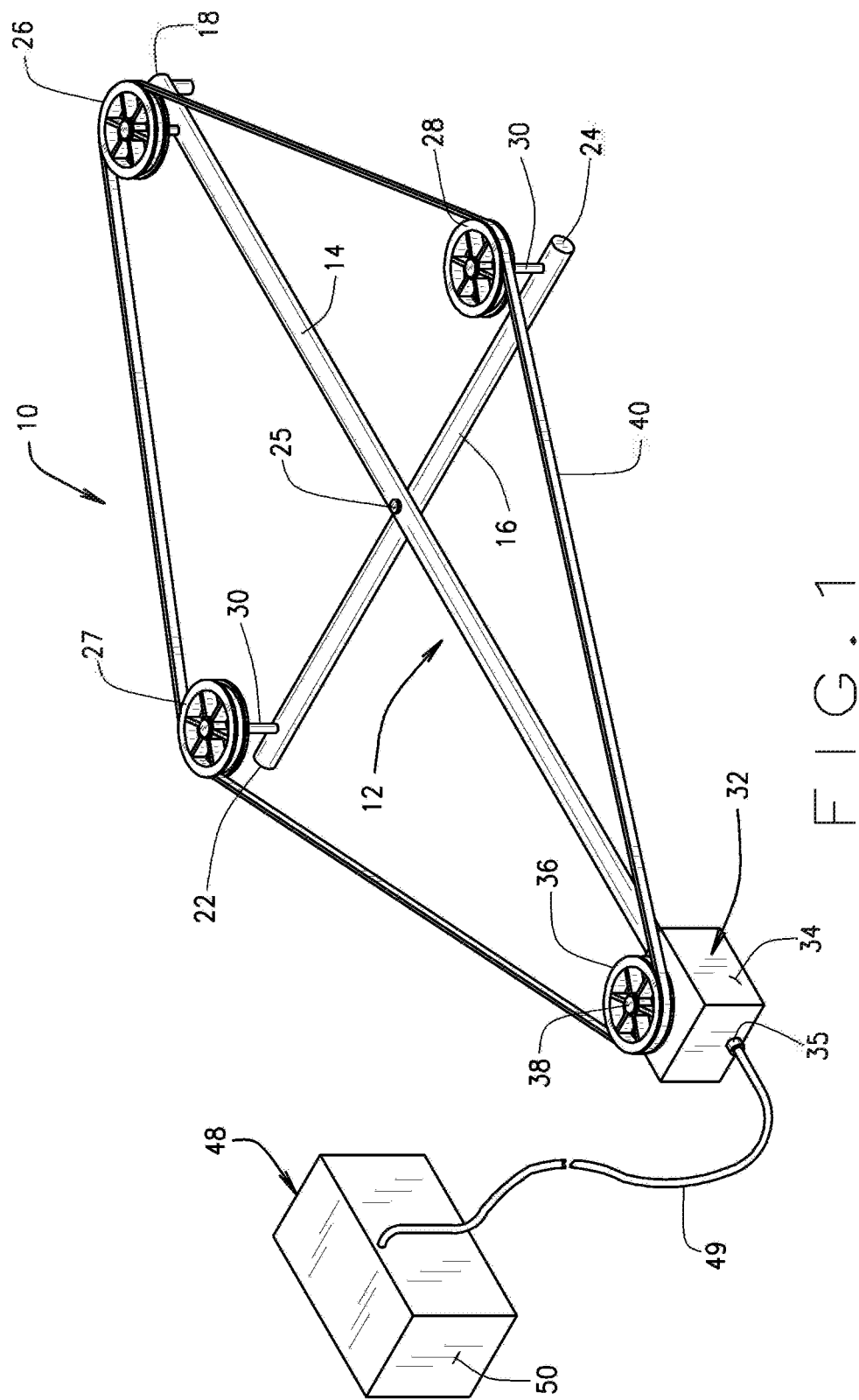
FIG. 1 is a perspective view of the components of the waterfowl decoy movement device.

The following detailed description illustrates the device by way of example and not by way of limitation. This description will clearly enable one skilled in the art to make and use the device, and describes several embodiments, adaptations, variations, alternatives and uses of the device, including what I presently believe is the best mode of making and using the device. Additionally, it is to be understood that the disclosure is not limited in its application to the details of construction and the arrangements of components set forth in the following description or illustrated in the drawings. The device is capable of other embodiments and of being practiced or being carried out in various ways. Also, it is to be understood that the phraseology and terminology used herein is for the purpose of description and should not be regarded as limiting.

FIG. 1 illustrates one aspect of the self-contained waterfowl decoy movement device, showing salient features, and referred to generally by reference number 10. Device 10 includes a frame 12, which is shown in greater detail in FIG. 3, comprising frame members 14 and 16. Frame members 14 and 16 are elongated members comprising a durable, waterproof material such as metal, fiberglass or the like. Small gauge metal pipe works well; however, any material that serves the intended purpose is satisfactory. Frame member 14 has first and second ends 18 and 20; frame member 16 has first and second ends 22 and 24.

In the illustrated aspect, frame members 14 and 16 are arranged as a cross and affixed together at pivot 25. Thus cruciform configuration works particularly well to allow folding of the frame, as will be explained below, but any configuration of a frame is intended to be within the scope of the invention. By way of example, frame 12 could comprise a plurality of frame members arranged in a rectangle or triangle. One or more frame members could be configured as a circle or oval.

In any event, in the illustrated aspect, there are pulley wheels 26, 27 and 28 rotatable affixed to ends 18, 22 and 24 respectively. These pulley wheels are of conventional design and affixed to the ends of the frame members by axles 30 or other appropriate means, such that the pulley wheels can spin or freewheel about their vertical axis. Pulley wheels 26, 27 and 28 are passive, in that they are not driven pulleys, and function as guides for the drive belt described below.

It will be appreciated if frame 12 is arranged in a manner other than cruciform, pulley wheels may be rotatably attached to the frame in a space-apart relationship along the length of the frame.

There is a drive motor 32 at end 20 of frame member 14. Drive motor 32 can be any appropriate electric motor. The motor is sealed in a waterproof outer housing 34 with an exposed waterproof electrical connection 35 or plug. There is a drive pulley wheel 36 connected to drive motor 32 at the top of housing 34. Drive pulley 36 is connected to the motor by a drive axle 38. Drive axle 38 is attached to the electric drive motor by appropriate gears or other means such that when motor 32 is energized, as explained below, it turns drive axle 38 at a predetermined, rotational speed. The speed can be adjusted by step-down or step-up gearing internal to the motor housing, as desired.

There is a drive belt 40 suspended above frame 12 on pulley wheels 26, 27, 28 and 36. Drive belt 40 can be made of any acceptable belt material. In the illustrated aspect, when drive belt 40 is mounted on the pulley wheels it defines a generally diamond configuration.

The device is intended to animate waterfowl decoys, such as duck decoys 42, 43 and 44. Any number of decoys may be employed; however, one to three decoys work well. Also, decoys of any species of ducks may be used. For example, the decoys can be mallard ducks, wood ducks, teals, buffleheads pintails, Muscovy and so forth. Moreover, the duck decoys can be mixed such that the device employs different species. The device can be used with goose decoys as well.

In any event, waterfowl decoys generally are provided with swim clips 45 at the bottom that function as a rudder as well as providing a place to secure a line. In use with the illustrated device, a flexible tether line 46 is attached to the decoy, usually at the front end of the swim clip, preferably with a snap swivel. Line 46 preferably is a light gauge, strong line, such as monofilament fishing line, nylon string or the like. Line 46 is attached to drive belt 40. The length of line 46 can be adjusted depending upon the depth of water in which the device is used It is advantageous if line 46 also is attached to drive belt 40 with a snap swivel clip that keeps line 46 from tangling and allows the decoy to properly orientate when propelled by the drive belt, as will be described.

Drive motor 32 is operatively connected to a source of electrical current. Although it could be connected to an AC outlet by a waterproof electric cord, a more practical source of electric power for the environment is battery pack 48 which is operatively connected to the drive motor by wire 49 at connection 35. The attachment can be made through a waterproof plug or similar structures. In a preferred aspect, battery pack 48 is sealed in a waterproof case 50 with an exposed off-on switch 52. In one aspect, power pack 48 includes a 12 volt, 5 to 7.5 amp hour rechargeable battery. Power pack 48 can be submerged in water, requiring no additional parts, or can be mounted adjacent to the water on a post 54 or other structure.

It will be appreciated from the foregoing that device 10 is substantially self-contained. It can be folded up and transported and unfolded for use. Decoys 42-44 can be attached to drive belt 40 prior to use or at the site of use. In use, the hunter simply places frame 12 in the water and decoys, such as 42, 43 and 44 tethered to drive belt 40 by lines 46 float on the surface. Frame 12 requires no anchors, pegs or the like, but is placed on the bottom of the body of water. The hunters may place other decoys in a standard spread around the device or may use more than one device 10.

Figure 2:
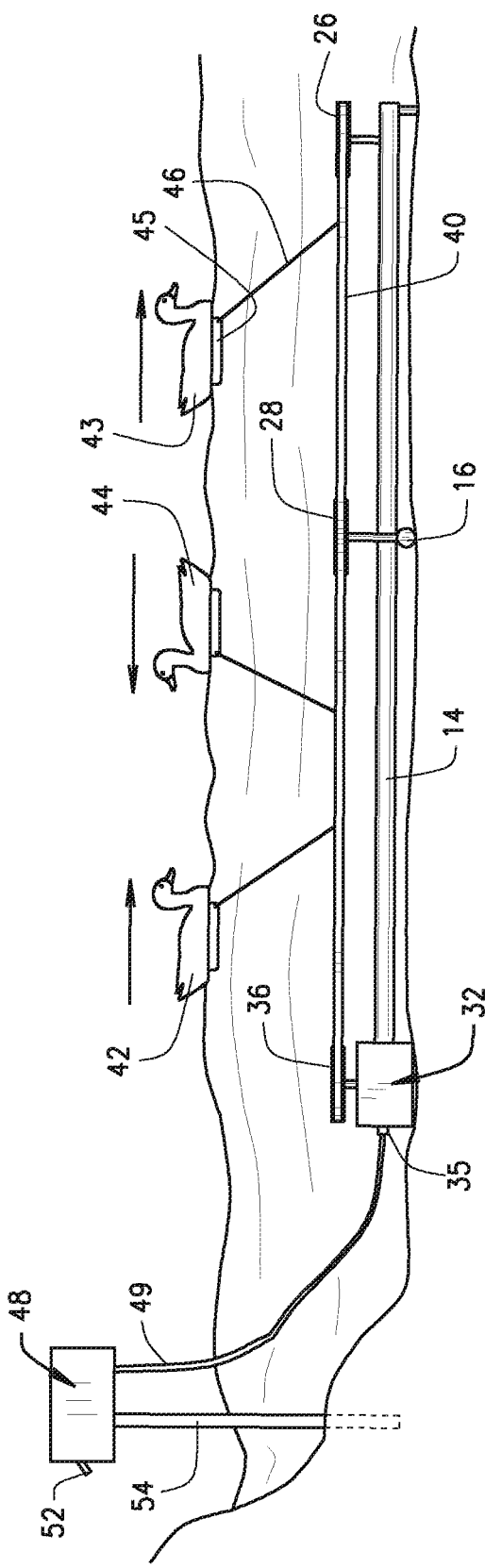
FIG. 2 is a side elevation view of the device in use.

The hunter connects battery pack 48 to drive motor 32 by plugging in wire 49 to connection. The hunter turns on battery pack 48 and drive motor 32 turns drive pulley wheel 36 which in turn moves drive belt 40 around the pulley wheels. The decoys attached to the drive belt are towed about the device on the surface of the water, enhancing the life-like appearance of the decoys. As seen in FIG. 2, in an array of three decoys, two of the decoys are on one side of the device moving in the same direction; the third decoy has rounded the tip and is heading back on the opposite side of the device.

As mentioned above, in the illustrated aspect the diamond shaped configuration of drive belt 40 works well. The decoys track relatively straight ahead and then turn at the corners of the diamond, enhancing their movement to create more life-like appearance. However, the angles are not so sharp as to cause binding or pinching. Furthermore, the thin gauge of tether lines 46, and some slack in the lines, allow the decoys to wobble or jerk forward or move in response to ripples and wind, again imparting more lifelike movement to the decoys.

Figure 4:
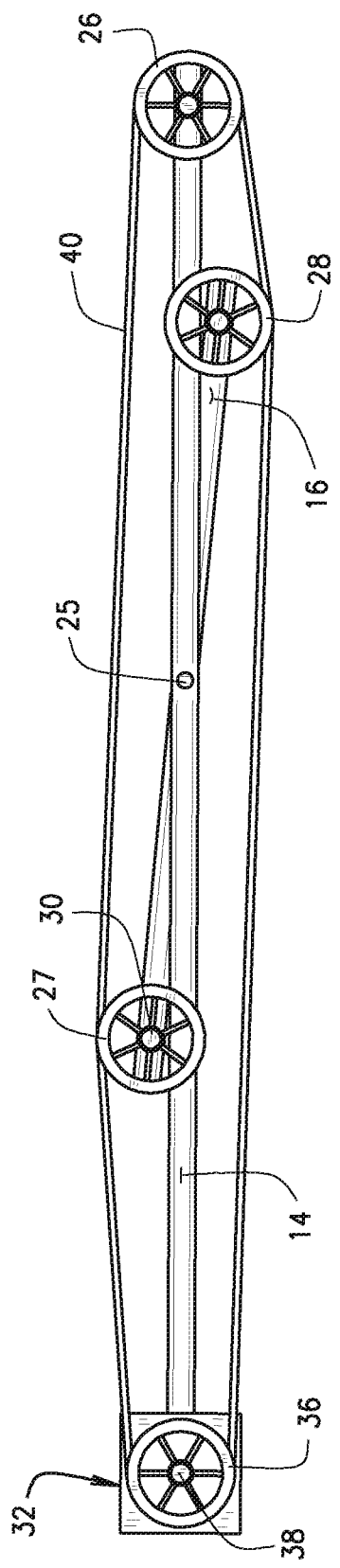
FIG. 4 is a top plan of the frame of FIG. 3 folded for transport or storage.

As seen in FIG. 4, frame 12 can be folded at pivot 25 into a generally linear configuration for transport or storage. Frame members 14 and 16 can be joined at pivot 25 with a set screw or nut and bolt other apparatus that can be loosened and tightened for folding for storage or unfolding for use.

Figure 5:
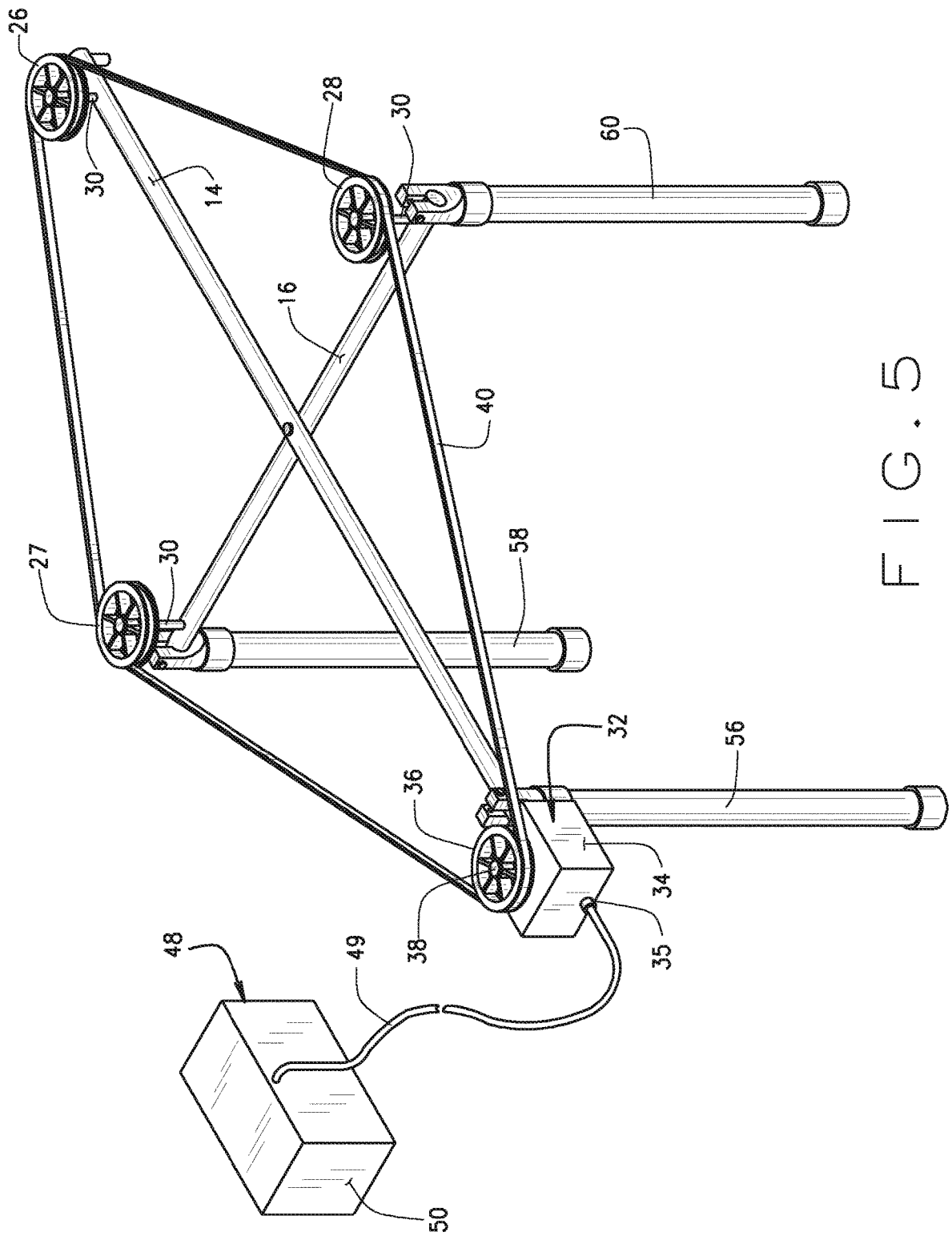
FIG. 5 is a perspective view of another aspect of the waterfowl decoy movement device.

An optional deeper water aspect of the device is shown in FIG. 5. There are removable stilts 56, 58 and 60 under the frame that rest on the bottom of the water to elevate the frame above the bottom, allowing the decoys to float on the surface of deeper water. The stilts are easily attached or snapped onto free ends of the cross members, with one being positioned at drive motor 32 to support the heaviest end of frame 12. This triangular arrangement of stilts imparts significant stability to the device. The frame could include stilts under each corner, however. The stilts may be constructed and attached to the frame members in any convenient way. As described above, the embodiment shown in FIG. 5 requires no anchors, pegs, stakes or the like.

It will be appreciated from the foregoing that device 10 is self-contained and portable. That is, once the decoys are tethered to the drive belt, the entire device is ready for deployment without the use of stakes, anchors, posts or other extraneous elements. Device 10 can be deployed in the water as is. Post 54 for mounting the battery pack is an optional convenience item.

At the end of the hunt, the hunter can simply lift the entire device out of the water and fold the frame into its linear configuration for transport or storage. Removing the decoys from the drive belt for transportation and storage is optional.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

The invention claimed is:

1. An animated waterfowl decoy device, comprising:
   intersecting first and second support members joined by a pivot and configured to flexibly fold into a substantially straight line linear pattern for storage, and into a substantially cruciform pattern when deployed in water, each support member having first and second ends;
   a plurality of pulley wheels, a respective pulley wheel of the plurality of pulley wheels attached to and located at each end of the support members;
   a drive belt which circumnavigates the pulley wheels so that when the support members are placed into a configuration for decoy use, the pulley wheels form a desired rotation pattern for decoys;

a drive motor operatively associated with one of the pulley wheels; and, an electric source operatively associated with the drive motor, wherein the decoy device is free of components anchoring the decoy device to the ground; and wherein the decoy device is self-contained, portable, and can be deployed in the water as is by unfolding the intersecting first and second support members joined by the pivot into the substantially cruciform pattern.

2. The device of claim 1 wherein at least one waterfowl decoy is attached to the drive belt by a flexible tether line.

3. An animated waterfowl decoy kit comprising an animated waterfowl decoy device, comprising:

intersecting first and second support members joined by a pivot and configured to flexibly fold into a substantially straight line linear pattern for storage, and into a substantially cruciform pattern when deployed in water, each support member having first and second ends;

a plurality of pulley wheels, a respective pulley wheel of the plurality of pulley wheels attached to and located at each end of the support members;

a drive belt which circumnavigates the pulley wheels so that when the support members are placed into a configuration for decoy use, the pulley wheels form a desired rotation pattern for decoys;

a drive motor operatively associated with one of the pulley wheels; and, an electric source operatively associated with the drive motor, wherein the decoy device is free of components anchoring the decoy device to the ground; and wherein the decoy device is self-contained, portable, and can be deployed in the water as is by unfolding the intersecting first and second support members joined by the pivot from the substantially straight line linear storage configuration into the substantially cruciform pattern; and further comprising a waterproof battery pack and an array of swim clips.

4. The animated waterfowl decoy kit of claim 3 further comprising at least two snap on stilts.

5. The animated waterfowl decoy kit of claim 3 further comprising a storage bag to transport the decoy device.

* * * * *